(12) United States Patent
Muller (10) Patent No.: US 10,924,500 B2
(45) Date of Patent: Feb. 16, 2021

(54) SYSTEM TO DETECT BEHAVIOUR IN A TELECOMMUNICATIONS NETWORK

(71) Applicants: Koninklijke KPN N.V., The Hague (NL); Nederlandse Organisatie voor Toegepast-Natuurwetenschappelijk Onderzoek TNO, 's-Gravenhage (NL)

(72) Inventor: Frank Muller, Delft (NL)

(73) Assignees: Koninklijke KPN N.V., Rotterdam (NL); Nederlandse Organisatie Voor Toegepast—Natuurwetenschappelijk Onderzoek TNO, 's-Gravenhage (NL)

( * ) Notice: Subject to any disclaimer, the term of this patent is extended or adjusted under 35 U.S.C. 154(b) by 0 days.

(21) Appl. No.: 14/646,554

(22) PCT Filed: Nov. 22, 2013

(86) PCT No.: PCT/EP2013/074440
§ 371 (c)(1),
(2) Date: May 21, 2015

(87) PCT Pub. No.: WO2014/079960
PCT Pub. Date: May 30, 2014

(65) Prior Publication Data
US 2015/0304345 A1 Oct. 22, 2015

(30) Foreign Application Priority Data

Nov. 22, 2012 (EP) ..................................... 12193884

(51) Int. Cl.
*G06F 11/00* (2006.01)
*G06F 12/14* (2006.01)
(Continued)

(52) U.S. Cl.
CPC .......... *H04L 63/14* (2013.01); *H04L 63/1425* (2013.01); *H04W 24/08* (2013.01); *H04W 88/02* (2013.01)

(58) Field of Classification Search
CPC combination set(s) only.
See application file for complete search history.

(56) References Cited

U.S. PATENT DOCUMENTS 5,953,652 A * 9/1999 Amin .................. H04L 63/1408
455/410
8,387,141 B1 * 2/2013 Zhukov ............. H04W 12/1208
726/22
(Continued)

FOREIGN PATENT DOCUMENTS

EP        2 139 279 A1    12/2009
JP         2004-320636      11/2004
(Continued)

OTHER PUBLICATIONS

European Search Report, European Patent Application No. 12193884.9, dated Mar. 1, 2013.
(Continued)

*Primary Examiner* — Phy Anh T Vu
(74) *Attorney, Agent, or Firm* — McDonnell Boehnen Hulbert & Berghoff LLP (57) ABSTRACT

A system is provided for detecting behaviour of a mobile telecommunications device in a telecommunications network. Malware in mobile devices can cause malicious behaviour in the device, for example sequential attaching and detaching of an infected device relative to a telecommunications network. A telecommunications network is provided which is configured to identify at least one mobile telecommunications device and to receive signals from the mobile telecommunications device and process the signals into data streams. The data streams include data of a first
(Continued)

type arranged to cause an event of a first type within the telecommunications network. The network is arranged to monitor an occurrence in the data streams of the data of the first type and to register when the occurrence exceeds a level indicating acceptable behaviour of the mobile telecommunications device in the telecommunications network. A device for detection of mobile device behaviour is also described.

11 Claims, 3 Drawing Sheets

(51) Int. Cl.
  *G06F 12/16* (2006.01)
  *H04L 29/06* (2006.01)
  *H04W 24/08* (2009.01)
  *H04W 88/02* (2009.01)

(56) References Cited

U.S. PATENT DOCUMENTS

| | | | |
|---|---|---|---|
| 2004/0054925 A1* | 3/2004 | Etheridge | H04L 63/1425 726/22 |
| 2004/0230834 A1* | 11/2004 | McCallam | H04L 41/046 726/23 |
| 2004/0250124 A1* | 12/2004 | Chesla | G06F 21/552 726/13 |
| 2005/0198099 A1* | 9/2005 | Motsinger | G06F 21/55 709/200 |
| 2005/0204169 A1* | 9/2005 | Tonnesen | H04L 63/1425 726/5 |
| 2006/0140127 A1* | 6/2006 | Lee | H04L 43/18 370/241 |
| 2006/0230450 A1* | 10/2006 | Bu | H04L 63/1416 726/22 |
| 2006/0288407 A1 | 12/2006 | Naslund et al. | |
| 2007/0121596 A1* | 5/2007 | Kurapati | H04M 7/0078 370/356 |
| 2007/0283436 A1* | 12/2007 | Duffield | H04L 63/1425 726/23 |
| 2008/0022402 A1* | 1/2008 | Francfort | H04L 63/1408 726/22 |
| 2010/0064341 A1 | 3/2010 | Aldera | |
| 2010/0064368 A1* | 3/2010 | Stolfo | G06F 21/564 726/24 |
| 2010/0199345 A1* | 8/2010 | Nadir | H04L 63/02 726/11 |
| 2010/0304706 A1* | 12/2010 | Haverty | H04K 3/45 455/404.1 |
| 2011/0185419 A1 | 7/2011 | Boteler et al. | |
| 2011/0230192 A1* | 9/2011 | Tiwari | H04W 36/0022 455/436 |
| 2012/0124666 A1* | 5/2012 | Kim | H04L 63/1458 726/23 |
| 2012/0129517 A1* | 5/2012 | Fox | H04W 12/12 455/425 |
| 2012/0155274 A1 | 6/2012 | Wang et al. | |
| 2012/0180119 A1* | 7/2012 | Bessis | H04W 12/0602 726/11 |
| 2013/0291105 A1* | 10/2013 | Yan | G06Q 10/06 726/22 |
| 2013/0304677 A1* | 11/2013 | Gupta | G06N 5/043 706/12 |
| 2014/0031005 A1* | 1/2014 | Sumcad | H04W 4/046 455/405 |
| 2015/0033322 A1* | 1/2015 | Wang | H04L 63/1425 726/13 |
| 2016/0248789 A1* | 8/2016 | Nakamatsu | H04L 63/1416 |
| 2019/0028479 A1* | 1/2019 | Mori | H04L 63/101 |

FOREIGN PATENT DOCUMENTS

| | | |
|---|---|---|
| JP | 2006-295240 | 10/2006 |
| JP | 2006-350561 | 12/2006 |
| KR | 100628329 B1 | 9/2006 |
| WO | 98/33340 A2 | 7/1998 |
| WO | 98/33340 A3 | 7/1998 |
| WO | 2006/104752 A1 | 10/2006 |
| WO | WO2007075423 | 7/2007 |
| WO | 2011072719 A1 | 6/2011 |

OTHER PUBLICATIONS

Mulliner, Collin et al., "Taming Mr. Hayes: Mitigating Signaling Based Attacks on Smartphones", IEEE/IFIP International Conference on Dependable Systems and Networks (DSN 2012), 2012, pp. 1-12.
PCT International Search Report, PCT International Application No. PCT/EP2013/074440, dated Feb. 7, 2014.

* cited by examiner

SYSTEM TO DETECT BEHAVIOUR IN A TELECOMMUNICATIONS NETWORK

CROSS REFERENCE TO RELATED APPLICATIONS

The present application is a national stage entry of, and claims priority to, PCT/EP2013/074440, filed on Nov. 22, 2013, which claims priority to European Patent Application EP 12193884.9, filed in the European Patent Office on Nov. 22, 2012, both of which are hereby incorporated in their entirety herein by reference.

FIELD OF INVENTION

The invention relates to a system for detecting behaviour of a mobile telecommunications device in a telecommunications network, and further relates to a device for detecting behaviour of a mobile telecommunications device within a telecommunications network.

Telecommunications networks provide radio telecommunication to users of mobile devices, typically according to agreed and standardised radio protocols, for example GSM, UTMS and LTE as would be known by the skilled person.

Mobile telecommunications devices are common and include mobile phones and in particular smartphones, tablet devices and other handheld computer devices, handheld personal assistants, and even communication devices situated in vehicles. All can provide users with telecommunication with each other and with access to the internet while moving around.

Access to the internet exposes devices to malware and malicious applications that may be downloaded, accidentally or otherwise, onto the mobile device from the internet. Typically, and often because of their smaller size and memory capacity, mobile telecommunications devices do not contain security features which are as stringent as those available for desk computers and other large devices with internet access. As such, these smaller mobile telecommunications devices are vulnerable to infection and attack by malware and malicious applications, which will typically infect the application processor of a mobile device. But because mobile telecommunications devices are also typically in direct contact with a radio telecommunications network the telecommunications network itself is vulnerable to attack from any malware or malicious applications residing on the mobile devices.

Existing methods to detect malicious mobile device behaviour are applied entirely within the mobile handset itself. For example, "Taming Mr Hayes: Mitigating signaling based attacks on smartphones", IEEE/IFIP International Conference on Dependable Systems and Networks (DSN 2012), 2012, dsn, pp. 1-12, Collin Mulliner, Steffen Liebergeld, Matthias Lange, Jean-Pierre Seifert, describes a method of detecting malicious behaviour within the application processor of a mobile phone and proposes a virtual partition of the application processor as part of the solution.

However a disadvantage of this method is that if the mobile device has been infected with malware there can be no real certainty that the detection method itself can be trusted.

Similarly, U.S. 2006/0288407 describes a method to perform detection on a mobile handset and therefore also results in a similar disadvantage.

Nevertheless, it is a problem to correctly identify the existence of malware or malicious software on a mobile device because only once an infected device has been correctly identified can appropriate action be taken.

DESCRIPTION OF THE INVENTION

The problem is solved according to the invention as described in the claims.

The claims describe a system for detecting behaviour of a mobile telecommunications device in a telecommunications network. The system includes a telecommunications network configured to identify at least one mobile telecommunications device and to receive signals from the mobile telecommunications device and further to process the signals into data streams. The data streams include data of a first type arranged to cause an event of a first type within the telecommunications network. The network is arranged to monitor an occurrence in the data streams of the data of the first type and is arranged to register when the occurrence exceeds a level indicating acceptable behaviour of the mobile telecommunications device in the telecommunications network.

The system as claimed solves the problem by identifying malicious behaviour in a mobile device, but identifying it from within the telecommunications network itself. This is done according to the arrangement of the invention by monitoring the data streams, or transfers of data, which occur in the network due to the interaction between the network and the mobile. This data is monitored for excessive occurrences of particular signals.

Malware resident on a mobile device may cause that device to indulge in malicious behaviour, which is typically anything that uses up network resources without being for an express user intention. Typically it is anything which uses up network resources but without resulting in a benefit for the user or for the device. For example, a user of a mobile device may wish to download a video to watch on the device. This will use up resources but the use of resources in this case is time limited and in any event, once the video is downloaded the user spends time watching the video and while doing so is unlikely to download other videos or perform other tasks. Malware, however, may be programmed to download videos continuously, and this uses excessive network resources.

In an alternative example, malware may be programmed to continuously perform attach and detach of the mobile device onto the network. This will use excessive network resources because the network will try to authenticate the mobile device every time the device attaches. The continuous attach and detach however does not result in an advantage for either the user or the mobile device.

In an alternative example, malware may be programmed to manipulate signal level reports used by the network for handover decisions. The mobile device continuously measures the signal levels from base stations in the surrounding cells and reports the signal levels to the network. The network uses this, and other information, to device whether or not to handover the communication with the mobile device to a different base station than the one that is currently serving the mobile device. Malware could be programmed to manipulate the measurement reports in such a way that a very large number of handovers takes place, which uses excessive network resources.

In an alternative example the malware may be programmed to force the mobile device which carries the malware to continuously request call forwarding. When a request for call forwarding is made the device requests the network to forward incoming calls to a second number. The continuous making of this request will use up network resources.

In an alternative example the malware may constantly request the setting up of bearers, and in particular new bearers, between the device and the network. Again, this uses up network resources.

In an alternative example the malware may force the mobile device which carries the malware to continuously make requests for service without using the proffered services. These requests may be for any kind of service typically provided by the telecommunications network but it wastes network resources when the continuous requests for service do not result in a provided service which benefits either the user or the mobile device making the request.

In all these examples an exchange of data occurs between the mobile device and the telecommunications network but also further within the telecommunications network itself. As is known by the skilled person, when the mobile device transmits signals to the telecommunications network they are received in a base station and processed into data streams internal to the telecommunications network. For example, if an attach request is made by a mobile device then the telecommunication network which receives the attach request makes an attempt to authenticate the mobile device. This results in data streams, or signals, being sent between, for example in the case of a UMTS network, the radio network controller RNC, the mobile switching centre MSC, the Home Location Register HLR, and the Authentication Centre AuC, as would be known by the skilled person. As would also be known by the skilled person, other malicious behaviours described would also result in signalling, or data streams, transmitted not just between the device and the network but also within the network itself.

The network can therefore detect malicious behaviour by monitoring the occurrence in the data streams in the network of data of a first type, typically a predetermined type which represents some interaction in the network between network devices for the normal processing of signals. Further the network registers when this occurrence exceeds a level which indicates acceptable behaviour of the mobile telecommunications device in the telecommunications network. In other words, the network detects malicious behaviour by monitoring for, and detecting, the incidence of various types of data steams within the network itself and registering when the occurrence is too high.

For example, in order to detect the malicious behaviour in which a device continuously attempts to attach and detach the network may count the number of times the Mobile Switching Centre, MSC, is caused to request authentication of the device at the Authentication Centre AuC, or alternatively count the number of times the Authentication Centre AuC signals back a reply.

In a particularly advantageous embodiment the detection of data steams is performed in the core network, and in particular in the Mobility Management Entity MME if the network is an LTE network, in the MSC if it is a UMTS or GSM network or the Serving Gateway Support Node SGSN in a GPRS network. In this embodiment the incidence of particular, or predetermined, data streams can be identified in a central location within each respective network. This has the advantage that it reduces the time it takes for the telecommunications network to identify mobile devices which may be infected by malware.

However the occurrence of specific data streams may be detected further back in the network. In an example of this, excessive attach requests may be detected at the AuC by detecting authentication attempts per mobile device. Alternatively, excessive attach requests may be detected by counting at the HLR the number of times the network requests data regarding a particular mobile device.

In certain embodiments detection could be performed in the eNodeB or base station. This has the advantage that detection of malicious behaviour uses fewer network resources. For example, excessive numbers of attach and detach could be detected in the receiving base station. However, a particular disadvantage of performing detection at the base station, for example, occurs when signals from the mobile device arrive in the network through different base stations, and one example of this is when a device is physically moving quickly across base station cells. In such a case no one particular base station, or eNodeB, will necessarily receive the full signalling from the device and therefore no one base station will be able to unambiguously perform detection.

In a particularly advantageous embodiment the network counts the occurrence of particular data signals when their rate of occurrence exceeds a predetermined temporal rate. For example, if the network is monitoring for the sending of an authentication request to the AuC, the network is arranged to detect when the rate of transmission of authentication requests for a particular mobile exceeds a predetermined threshold and also to count the number of times authentication is then requested, while the rate of authentication requests exceeds the predetermined rate.

In other words the network monitors for, and detects when the frequency of a certain predetermined signal or data occurrence in the data streams becomes too high. The network then proceeds to count the number of occurrences while the rate remains above the predetermined temporal rate.

This particular embodiment is even more advantageous if the network is further arranged to register when the number of detected occurrences itself exceeds a predetermined threshold. In our example this would mean that the network registers when the number of authentication requests exceeds a certain number, with each authentication request having been received at a rate which is greater than the predetermined temporal rate.

In a further advantageous embodiment, the network can detect if the rate of occurrence of a signal or data event, for example a request for authentication transmitted to the AuC, occurs at or above a predetermined temporal rate by measuring the time elapsed between successive occurrences. In this embodiment the network is arranged to detect the time elapsed between two consecutive authentication requests to the AuC, in our example, and calculate when this elapsed time is less than a predetermined time interval. The data occurrences are deemed to occur at a rate which exceeds the predetermined rate when they occur within the respective predetermined time interval.

In a particularly advantageous example the network includes a counter, C, and is arranged to detect a detectable event, X, which occurs within the network, for example the first instance of an attach, or, the transmission of a request for authentication to the AuC, or, the arrival of signaling in the MME indicating that a handover has taken place, and starts the counter.

The counter then becomes:

$$C=1$$

At the same time the network starts a timer. The counter is stored and associated with the mobile device.

If the next detection of X in the network takes place within a predetermined time interval then the counter becomes:

$$C=2$$

In an embodiment the timer measures a time t from the first detection of X and in this case the counter is incremented by 1 if the next detection occurs at a time, $t<\Delta$, where $\Delta$ is the predetermined time interval. In an alternative embodiment the time at each detection of the event X is registered, the time of the first event, ST, being stored and associated with the mobile device. A timer, T, is started at ST and the counter is incremented if the time of the next detected event X is t where:

$$t<ST+\Delta$$

Within this embodiment the value of ST is then replaced by the new time NT at which the second event X was detected.

In both embodiments the counter is incremented again if the following detection of X occurs within the same time interval. In such a case the counter would now register:

$$C=3$$

If the counter reaches a predetermined threshold, say $C_n$, in which case the counter becomes:

$$C=C_n$$

the telecommunications network registers the fact. This may be done by setting a flag, but the skilled person knows that there are alternative methods of registering.

In an alternative embodiment the network registers if the counter exceeds a predetermined threshold.

If X is not detected again within the predetermined time interval, the counter goes back to zero.

In an alternative embodiment the network could monitor and count the number of detachments of a particular mobile device.

In an embodiment in which handover is detected, the following further embodiment is particularly advantageous. The network maintains a record of the tracking area of the mobile device and also an indication of when the tracking area changes. This allows the network to know when the device is moving. If the network registers an excessive number of handovers the tracking area information can be used to discount excessive handovers when the device is actually in physically rapid movement.

In a further embodiment the network registers when a device switches frequently between neighbouring bases stations. This is an indication of genuine mala fide behaviour as normally such switches are suppressed by existing handover algorithms to avoid excessive handover of a mobile device that is actually physically situated on the border between two cells.

In an alternative, and particularly advantageous embodiment, the network monitors improbable service request combinations. For example, it is unlikely that a user would request the streaming of five movie downloads in parallel. Equally unlikely is that the user would genuinely attempt to listen to his own voice mail while making a telephone call. Such examples of unlikely behaviour can be determined and monitored for by the network.

Following detection of malicious behaviour the network can perform several actions. These include: detaching the mobile device; sending a signal to the device to permanently block access to the network; starting a back off timer to stop the mobile device from making another connection request within a certain time period; send a warning message to the owner of the device. In the last example the warning could be transmitted to the mobile device itself, via sms for example, however if the device is infected by malware and cannot be trusted then the network cannot assume any warning message transmitted to the device itself will be seen or heard by the user. Therefore a warning could be transmitted to the user via other channels relying on other data stored for the user, for example by email to a known email address.

In a further advantageous embodiment the network tracks the behaviour of several devices and aggregates the results. In this way malware behaviour can be tracked and monitored across an entire network.

In a further advantageous embodiment the network monitors for the occurrence of data of a second type in the data streams. Typically the data streams that are passed around the network include more than one type of data and in addition to including data of a first type arranged to cause an event of a first type within the telecommunications network, may include data of a second type arranged to cause an event of a second type with the telecommunications network. In a particularly advantageous embodiment the network may monitor for malicious behaviour of a mobile device by monitoring for the occurrence of both data of the first and second type, determining when each exceeds some predetermined threshold. In this case each can exceed a predetermined threshold individually, and the predetermined thresholds can be different or be the same, or, both occurrences can be aggregated and can be compared to a single predetermined threshold together. In an example the network could monitor for data occurrences in the network indicating device attach, as has already been described, but additionally monitor for data occurrences indicating device detach, and only if both occurrences exceed independent predetermined thresholds does the network register that malicious behaviour is occurring. This double measurement, although using extra network resources by effectively counting device behaviour twice, provides the network with a failsafe against accidental registers of malicious continuous attachment due to extraneous other factors within the network, such as error.

In an alternative embodiment, the network could count the occurrence of data of a first type indicating handover, and also count the occurrence of data of a second type indicating change of tracking area.

Further embodiments of the invention are described in the Figures.

Figure 1:
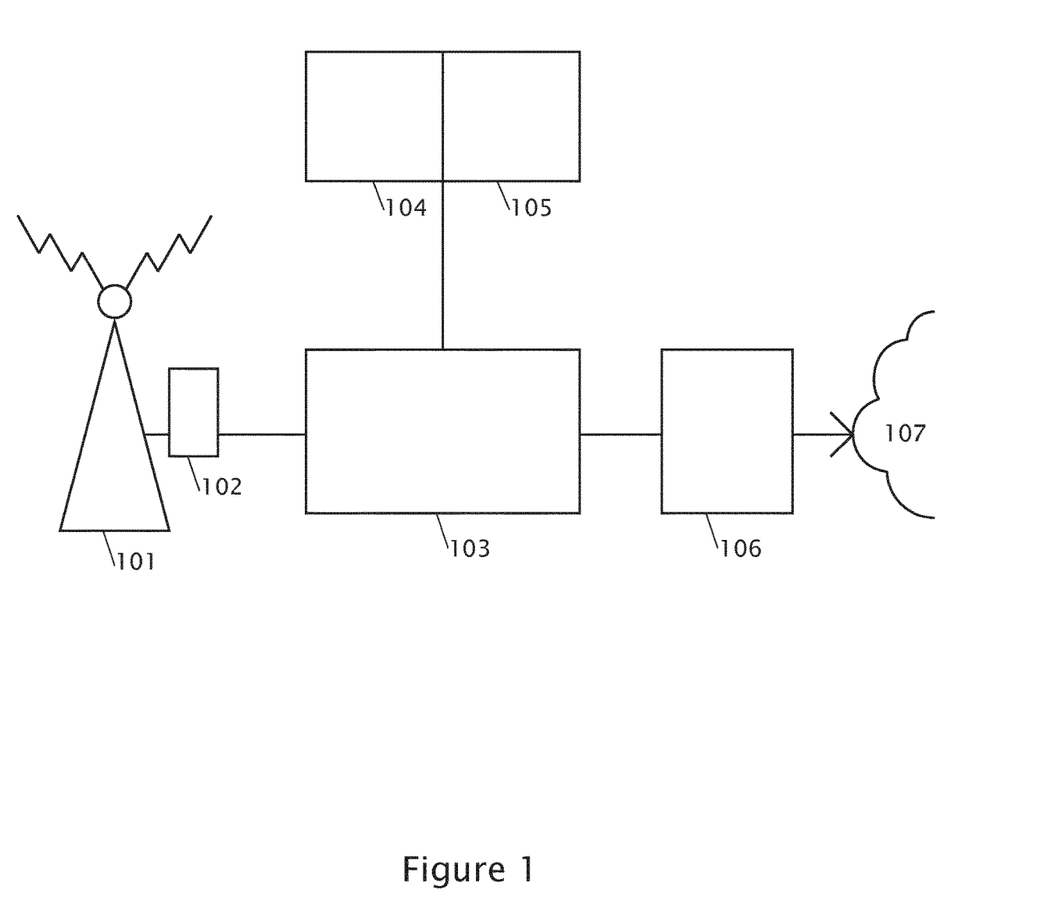
FIG. 1 shows a telecommunication network in which the invention can be advantageously used.

FIG. 1 shows a telecommunications network in which the invention can be used. As is known by the skilled person there are multiple technologies described by various telecommunication standards that define telecommunications systems. Typically they include the following layout though the skilled person knows and appreciates that there may be small variations and differences in the way systems work.

A telecommunications network includes a transmitter 101. This is usually called a base station, cell tower, or, in an LTE network an eNodeB. The transmitter is controlled by a base station controller 102, though in, for example, a UMTS network this would be a Radio Network Controller 102 and in, for example, an LTE network the control functions of the base station controller 102 may be subsumed into the eNodeB. Radio signals from hand held mobile devices are received at the transmitter 101, processed into signals and transmitted to the core network.

In the case of a GSM or 2G network the signals are passed to a Mobile Switching Centre, MSC, 103, which routes calls. Upon first receiving signal from a mobile it will query the Home Location Register, HLR, 104, which holds data on mobile subscribers to verify if the signal received is from a mobile device which is subscribed to the network. In order to authenticate the mobile device it will use keys held in the Authentication Centre, AuC, 105.

In the case of a UTMS or 3G network the verified and authenticated signals may be routed through a Gateway Support Node 106.

In the case of an LTE or 4G network the signals are passed to a Mobility Management Entity, MME, 103 and the mobile is verified and authenticated at the Home Subscriber Server, HSS, 104/105. Calls are then further routed through a Serving Gateway 106 to a further network 107 which may be the internet.

Figure 2:
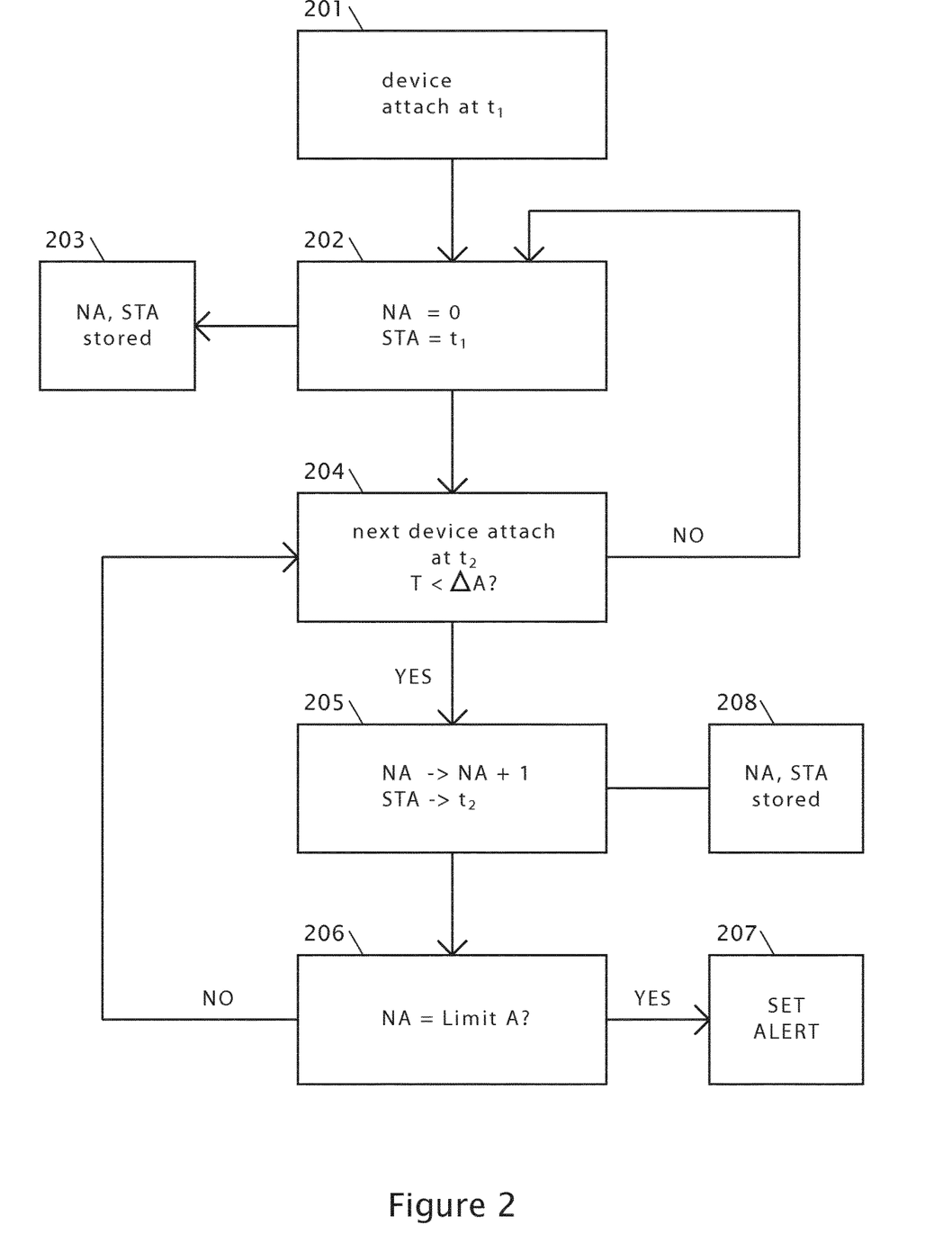
FIG. 2 shows a flow diagram of an embodiment of the invention.

FIG. 2 shows a flow diagram of an embodiment of the invention suitable for detecting excessive attaches of a mobile device to a telecommunications network. In an advantageous embodiment a device attaches 201 to the network at time $t_1$ through a base station and the network registers the attach, identifies the mobile device and begins authentication procedures. In parallel with the normal processing of the attach request the network performs the following steps. A counter NA, a start time STA and a timer are initiated 202. Typically the counter will be set to zero and in an advantageous embodiment the timer set to time $t_1$ registered by the network. The counter value and start time are stored 203 for future reference. The next time an attach is registered for the same device, say at time $t_2$ the elapsed time T, equal to:

$$t_2 - STA$$

is compared with a predetermined time interval $\Delta A$ 204.
If:

$$T = \Delta A, \text{ or, } T > \Delta A,$$

the counter NA and the timer are cleared, 202.
If:

$$T < \Delta A,$$

the counter NA is increased by a value of 1 and the value of STA is replaced by the time $t_2$, 205. NA and STA are again stored 208. In this case the counter value is further compared with a predetermined threshold, LimitA, 206.
If:

$$NA = LimitA,$$

an alert is set. If not, the method returns to step 204.

The skilled person will understand there are minor variations which can be made to the embodiment which will still work. For example, the counter could be increased if T is less than or equal to $\Delta A$ and only cleared if T is greater than $\Delta A$. Also for example, LimitA could be a value which must be exceeded, in which case an alert flag would be set if NA>LimitA. In another advantageous embodiment a counter could be decremented instead of clearing the counter NA in step 202 if the value of the counter is larger than 0.

As the skilled person will understand, appropriate values for LimitA and the predetermined time interval $\Delta A$ will vary depending on the network and the customer base. However, suitable values are $\Delta A = 500$ ms and LimitA=10.

The method as described allows a network to detect malicious behaviour in the form of excessive attach requests from an infected mobile and in an advantageous embodiment would be performed in the MSC, Serving Gateway or MME of the network, as appropriate.

Figure 3:
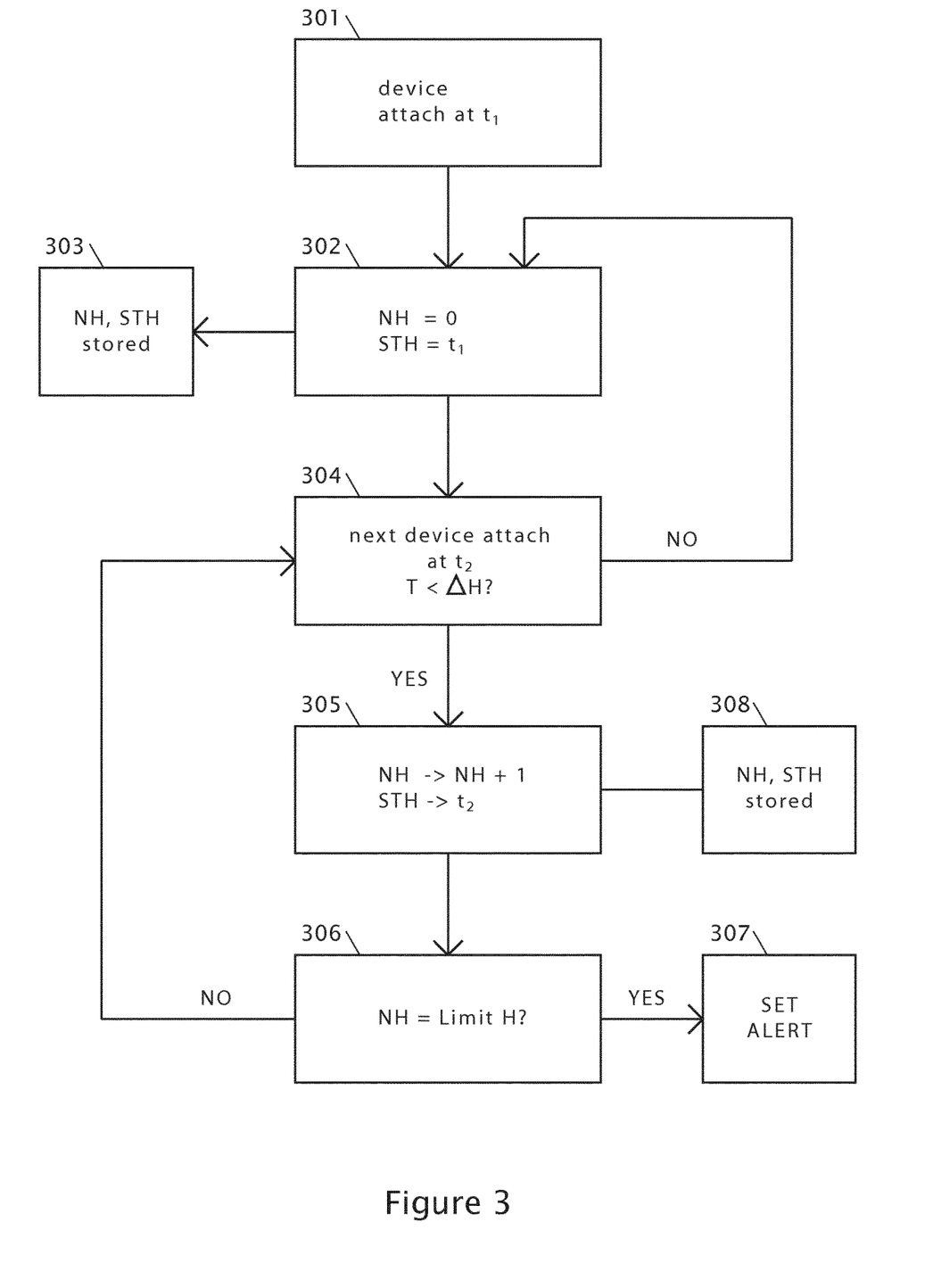
FIG. 3 shows a flow diagram of an embodiment of the invention.

FIG. 3 shows a flow diagram of an embodiment of the invention suitable for detecting excessive handovers of a mobile device in a telecommunications network and in a particularly advantageous embodiment would be performed in the MME of the network, which is informed of handovers before the handover takes place, referred to as an S1-handover, or after the handover has occurred, referred to as an X2-handover.

In order to carry out the method the MME performs the following steps for a group of mobile devices in its area. The group of devices monitored could be the group consisting of all mobile devices in its area, but could also be a sub-group of this group or some other further defined group. For example, the group of mobiles which are monitored could consist, say, of all new mobiles, or of mobiles whose previous activity suggests they might be at risk of infection, for example if they make frequent download requests, or of mobiles which are registered to particular users, says users who frequently change mobiles.

In this advantageous embodiment a device attaches 301 to the network at time $t_1$ through a base station and the network registers the attach, identifies the mobile device and begins authentication procedures. In parallel with the normal processing of the attach request the network performs the following steps. A counter NH, a start time STH and a timer are initiated 302. Typically the counter will be set to zero and in an advantageous embodiment the timer set to time $t_1$ registered by the network. The counter value and start time are stored 303 for future reference. The next time an attach is registered by the same device, say at time $t_2$ the elapsed time T, equal to:

$$t_2 - STH$$

is compared to a predetermined time interval $\Delta H$ 304.
If:

$$T = \Delta H, \text{ or, } T > \Delta H,$$

the counter NH and the timer are cleared, 305.
If:

$$T < \Delta H,$$

the counter NH is increased by a value of 1 and the value of STH is replaced by the time $t_2$, 305. NH and STH are again stored 308. In this case the counter value is further compared with a predetermined threshold, LimitH, 306.
If:

$$NH = LimitH,$$

an alert is set. If not, the method returns to step 304.

Again, the skilled person will understand there are minor variations which can be made to the embodiment which will still work. For example, the counter could be increased if T is less than or equal to $\Delta A$ and only cleared if T is greater than $\Delta A$. Also for example, LimitH could be a value which must be exceeded, in which case an alert flag would be set if NH>LimitH.

The particular advantages of the invention are that a telecommunications network can monitor for malicious activity in mobile devices and identify when a particular device is potentially infected by malware. Although use of the invention requires network resources that would otherwise not be expended, it allows the easy identification of devices which may use up far greater network resources if left unidentified.

As the skilled person will understand, appropriate values for LimitH and the predetermined time interval ΔH will vary depending on the network and the customer base. However, suitable values are ΔH=2 s and LimitH=20.

The invention claimed is:

1. A system comprising:
   a telecommunications network configured to identify mobile telecommunications device and comprising a core network and a base station, wherein the base station is configured to receive radio signals from the mobile telecommunications device and further process the radio signals into processed signals and to transmit the processed signals to the core network,
   wherein the telecommunications network is arranged to count in the core network a number of occurrences of a certain predetermined signal associated with the mobile telecommunications device, the certain predetermined signal representing an interaction between network devices in the core network for normal processing of signals,
   and wherein the telecommunications network is further arranged to register when the number of occurrences of the certain predetermined signal exceeds a level indicating acceptable behaviour of the mobile telecommunications device in the telecommunications network,
   wherein the certain predetermined signal indicates handover of the mobile telecommunications device.

2. The system according to claim 1, wherein the telecommunications network is arranged to count in the core network the number of occurrences of the certain predetermined signal by counting a number of times occurrence of the certain predetermined signal is detected when the number of occurrences exceed a predetermined temporal rate, and wherein the telecommunications network is further arranged to register when the number of times the occurrence of the certain predetermined signal detected exceeds a predetermined threshold.

3. The system according to claim 2, wherein the telecommunications network is arranged to count the number of occurrences of the certain predetermined signal when a time between a detected occurrence and a previously detected occurrence is within a predetermined time interval.

4. The system according to claim 3, wherein the telecommunications network includes a counter and a timer, and wherein the telecommunications network is arranged to start the counter upon detection of the occurrence and further to start the timer, and wherein the telecommunications network is further arranged to increase the counter by one unit if a following occurrence is within the predetermined time interval as measured by the timer.

5. The system according to claim 1, wherein the telecommunications network is further configured to detect when the number of occurrences of the certain predetermined signal exceeds a predetermined rate.

6. The system according to claim 5, wherein the telecommunications network includes a counter and a timer, and wherein the telecommunications network is arranged to start the counter upon detection of the occurrence and further to start the timer, and wherein the telecommunications network is further arranged to calculate a rate as a ratio of a counted number of detected occurrences to time as measured by the timer.

7. The system according to claim 1, wherein the telecommunications network is arranged to register when the number of occurrences of the certain predetermined signal exceeds the level for acceptable behaviour by setting a flag and/or starting a back off timer.

8. The system according to claim 1, wherein the telecommunications network is further arranged to monitor a tracking area of the mobile telecommunications device and to register the number of occurrences of the certain predetermined signal only when the monitoring of tracking area shows that the mobile telecommunications device remains within a single tracking area.

9. The system according to claim 1, wherein the telecommunications network is arranged to count the number of occurrences of the certain predetermined signal in a Mobility Management Entity or Serving Gateway Support Node or Mobile Switching Center of the telecommunications network.

10. The system according to claim 1, wherein the telecommunications network is further configured to:
    identify at least one additional mobile telecommunications device,
    receive radio signals from the at least one additional mobile telecommunications device and to process these radio signals into processed signals and to transmit the processed signals to the core network,
    count in the core network a number of occurrences of a certain predetermined signal associated with the at least one additional mobile telecommunications device, the certain predetermined processed signal representing an interaction between network devices for normal processing of signals,
    register when the number of occurrences of a certain predetermined signal associated with the at least one additional mobile telecommunications device exceeds a level indicating acceptable behaviour of the at least one additional mobile telecommunications device within the telecommunications network,
    wherein the telecommunications network is further arranged to aggregate registered data of the mobile telecommunications device and the at least one additional mobile telecommunications device,
    and wherein the certain predetermined signal associated with the at least one additional mobile telecommunications device indicates handover of the at least one additional mobile telecommunications device.

11. A method for detecting behaviour of a mobile telecommunications device in a telecommunications network comprising a core network, the telecommunications network including a base station, the method comprising:
    at the base station, receiving radio signals from the mobile telecommunications device, and processing the radio signals into processed signals and transmitting the processed signals to the core network;
    in the telecommunications network, identifying the mobile telecommunications device;
    the telecommunications network counting, in the core network, a number of occurrences of a certain predetermined signal associated with the mobile telecommunications device, the certain predetermined signal representing an interaction between network devices in the core network for normal processing of signals; and
    registering when the number of occurrences of the certain predetermined signal exceeds a level indicating acceptable behaviour of the mobile telecommunications device in the telecommunications network, wherein the certain predetermined signal indicates handover of the mobile telecommunications device.

\* \* \* \* \*